(12) United States Patent
Bao et al.

(10) Patent No.: US 9,586,178 B2
(45) Date of Patent: Mar. 7, 2017

(54) SYSTEM AND METHOD FOR REDUCING NITROGEN OXIDE IN EXHAUST

(71) Applicant: General Electric Company, Schenectady, NY (US)

(72) Inventors: Xiaoying Bao, Niskayuna, NY (US); Daniel George Norton, Niskayuna, NY (US); Lishun Hu, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 2 days.

(21) Appl. No.: 14/689,075

(22) Filed: Apr. 17, 2015

(65) Prior Publication Data

US 2015/0298060 A1     Oct. 22, 2015

(30) Foreign Application Priority Data

Apr. 17, 2014   (CN) .......................... 2014 1 0155346

(51) Int. Cl.
*B01D 53/94*     (2006.01)
*F01N 3/20*      (2006.01)

(52) U.S. Cl.
CPC ....... *B01D 53/9431* (2013.01); *F01N 3/2066* (2013.01); *F01N 3/2073* (2013.01); *B01D 2255/20761* (2013.01); *B01D 2255/50* (2013.01); *F01N 2240/25* (2013.01); *F01N 2240/28* (2013.01); *Y02T 10/24* (2013.01)

(58) Field of Classification Search
None
See application file for complete search history.

(56) References Cited

U.S. PATENT DOCUMENTS

| | | | |
|---|---|---|---|
| 2001/0002244 A1* | 5/2001 | Gieshoff | B01D 53/32 423/235 |
| 2004/0094401 A1 | 5/2004 | Carlow et al. | |
| 2004/0148860 A1 | 8/2004 | Fletcher | |

(Continued)

FOREIGN PATENT DOCUMENTS

| | | |
|---|---|---|
| EP | 0158823 A2 | 10/1985 |
| KR | 20030030278 A | 4/2003 |

OTHER PUBLICATIONS

Bromberg et al., "Emissions Reductions Using Hydrogen from Plasmatron Fuel Converters", International Journal of Hydrogen Energy, pp. 1115-1121, vol. 26, Issue 10, Oct. 2001.

(Continued)

*Primary Examiner* — Melvin C Mayes
*Assistant Examiner* — Sheng H Davis
(74) *Attorney, Agent, or Firm* — GE Global Patent Operation; Catherine J. Toppin

(57) ABSTRACT

A nitrogen oxide (NOx) abatement system is provided. The system includes a power generation device for generating power from a hydrogen-element containing fuel, an exhaust conduit in flow communication with an exhaust stream containing NOx which comes from the power generation device, a plasma reactor for reforming a portion of the hydrogen-element containing fuel with nitrogen to produce ammonia, and a NOx abatement reactor containing ammonia selective catalytic reduction (NH3-SCR) catalyst for receiving the exhaust stream and the ammonia and reducing NOx in the exhaust stream by causing the NOx to react with the ammonia to form nitrogen.

7 Claims, 3 Drawing Sheets

(56) References Cited

U.S. PATENT DOCUMENTS

| | | | |
|---|---|---|---|
| 2004/0168905 A1 | 9/2004 | Duvinage et al. | |
| 2005/0138916 A1* | 6/2005 | Bonadies | F01N 3/021 60/275 |
| 2005/0267224 A1 | 12/2005 | Herling et al. | |
| 2006/0010859 A1* | 1/2006 | Yan | F01N 13/011 60/286 |
| 2006/0075743 A1 | 4/2006 | Li et al. | |
| 2009/0068093 A1 | 3/2009 | Cho et al. | |
| 2010/0174470 A1 | 7/2010 | Bromberg et al. | |
| 2010/0251700 A1* | 10/2010 | Wan | F01N 3/0231 60/287 |
| 2013/0318947 A1* | 12/2013 | Malik | F01N 3/2073 60/274 |
| 2013/0336849 A1 | 12/2013 | Ikeda | |

OTHER PUBLICATIONS

Hammer et al., "Plasma Catalytic Hybrid Reforming of Methane", Fuel Chemistry Division Preprints, pp. 278-279, vol. 47, Issue 1, 2002.

Gallon, "Dry Reforming of Methane Using Non-Thermal Plasma-Catalysis", University of Manchester, School of Chemistry, pp. 1-243, 2010.

Lee et al., "Characteristics of plasma-assisted hydrocarbon SCR system", International Journal of Hydrogen Energy, pp. 11718-11726, vol. 36, 2011.

Great Britain Search and Examination Report issued in connection with corresponding GB Application No. 1506029.6 on Dec. 17, 2015.

Great Britain Office Action issued in connection with corresponding GB Application No. 1506029.6 on Sep. 9, 2016.

* cited by examiner

SYSTEM AND METHOD FOR REDUCING NITROGEN OXIDE IN EXHAUST

BACKGROUND

Exhaust gas is emitted as a result of the combustion of fuels such as coal, diesel, gasoline, or natural gas. In most cases the exhaust gas may include a small part of toxic substances, such as carbon monoxide (CO) from incomplete combustion, and nitrogen oxides (NOx) from excessive combustion temperatures. In such cases, it is required to reduce the toxic substances from the exhaust gas before it is discharged into the atmosphere. For example, controlling NOx emissions from diesel engines is of crucial importance for the commercial application of advanced diesel engine technologies as stricter emission standards are coming into effect worldwide.

One of the widely used strategies for controlling NOx emissions from lean-burnt engines is to reduce NOx with a reductant to nitrogen over a selective catalytic reduction (SCR) catalyst. Among the various SCR technologies, the SCR of NOx by ammonia ($NH_3$-SCR) offers some unique advantages such as high NOx reduction efficiencies over a wide range of temperatures, high selectivity to nitrogen ($N_2$) and good catalyst stability when compared with the alternative technologies such as the hydrocarbon/urea-SCR and the lean NOx trap (LNT) technologies.

Currently, the ammonia is bought off-site and transported to the site where the exhaust stream is treated to reduce NOx. Devices for transporting and storing the ammonia, such as storage tanks are needed. The use of such additional devices increases the whole operating cost.

Thus there is a need for practical systems, which can reduce NOx in exhaust with more readily available materials.

BRIEF DESCRIPTION

In one aspect, the present disclosure relates to a nitrogen oxide (NOx) abatement system. The system includes a power generation device for generating power from a hydrogen-element containing fuel, an exhaust conduit in flow communication with an exhaust stream containing NOx which comes from the power generation device, a plasma reactor for reforming a portion of the hydrogen-element containing fuel with nitrogen to produce ammonia, and a NOx abatement reactor containing ammonia selective catalytic reduction ($NH_3$-SCR) catalyst, for receiving the exhaust stream and the ammonia and reducing NOx in the exhaust stream by causing the NOx to react with the ammonia to form nitrogen.

In another aspect, the present disclosure relates to a NOx abatement method. In the method, an exhaust stream containing NOx is received from a power generation device, which generates power from a hydrogen-element containing fuel, ammonia is produced in situ by reforming a portion of the hydrogen-element containing fuel with nitrogen in a plasma reactor, and the NOx in exhaust stream is caused to react with the in situ produced ammonia to form nitrogen over an ammonia selective catalytic reduction ($NH_3$-SCR) catalyst.

BRIEF DESCRIPTION OF THE DRAWINGS

The above and other aspects, features, and advantages of the present disclosure will become more apparent in light of the subsequent detailed description when taken in conjunction with the accompanying drawing in which.

DETAILED DESCRIPTION

One or more embodiments of the present disclosure will be described below. Unless defined otherwise, technical and scientific terms used herein have the same meaning as is commonly understood by one of ordinary skill in the art to which this invention belongs. The terms "a" and "an" do not denote a limitation of quantity, but rather denote the presence of at least one of the referenced items. Approximating language, as used herein throughout the specification and claims, may be applied to modify any quantitative representation that could permissibly vary without resulting in a change in the basic function to which it is related. Accordingly, a value modified by a term or terms, such as "about," is not to be limited to the precise value specified. Additionally, when using an expression of "about a first value-a second value," the about is intended to modify both values. In some instances, the approximating language may correspond to the precision of an instrument for measuring the value or values.

Embodiments of the present disclosure refer generally to a nitrogen oxide (NOx) abatement system and method for reducing NOx from an exhaust stream, for example, from a power plant using fossil fuels, specifically power generation devices such as engines, gas turbines, and gas boilers, which generates power from a hydrogen-element containing fuel, which may contain hydrogen or a hydrocarbon. Examples of the hydrogen-element containing fuel include, but are not limited to methane and syngas (mixture of $H_2$ and CO). The NOx abatement system is a plasma assisted after treatment system which includes an exhaust conduit in flow communication with the exhaust stream, a plasma reactor for reforming a portion of the hydrogen-element containing fuel with nitrogen to in situ produce ammonia, and a NOx abatement reactor for receiving the exhaust stream and the in situ produced ammonia and causing the NOx in the exhaust stream to react with the ammonia so as to reduce NOx. The NOx abatement reactor is provided with ammonia selective catalytic reduction ($NH_3$-SCR) catalyst, which is capable of increasing the overall conversion of NOx and ammonia to nitrogen. As used herein, the term of "in situ" means that the ammonia used for reducing the NOx to nitrogen is produced at the location where the exhaust stream is emitted or discharged and/or where the NOx is reduced, contrary to ex situ where the ammonia is bought or produced off site, and in particular, it refers to ammonia production with resources that are available on the site of the exhaust stream is emitted or discharged and/or where the NOx is reduced.

Figure 1:
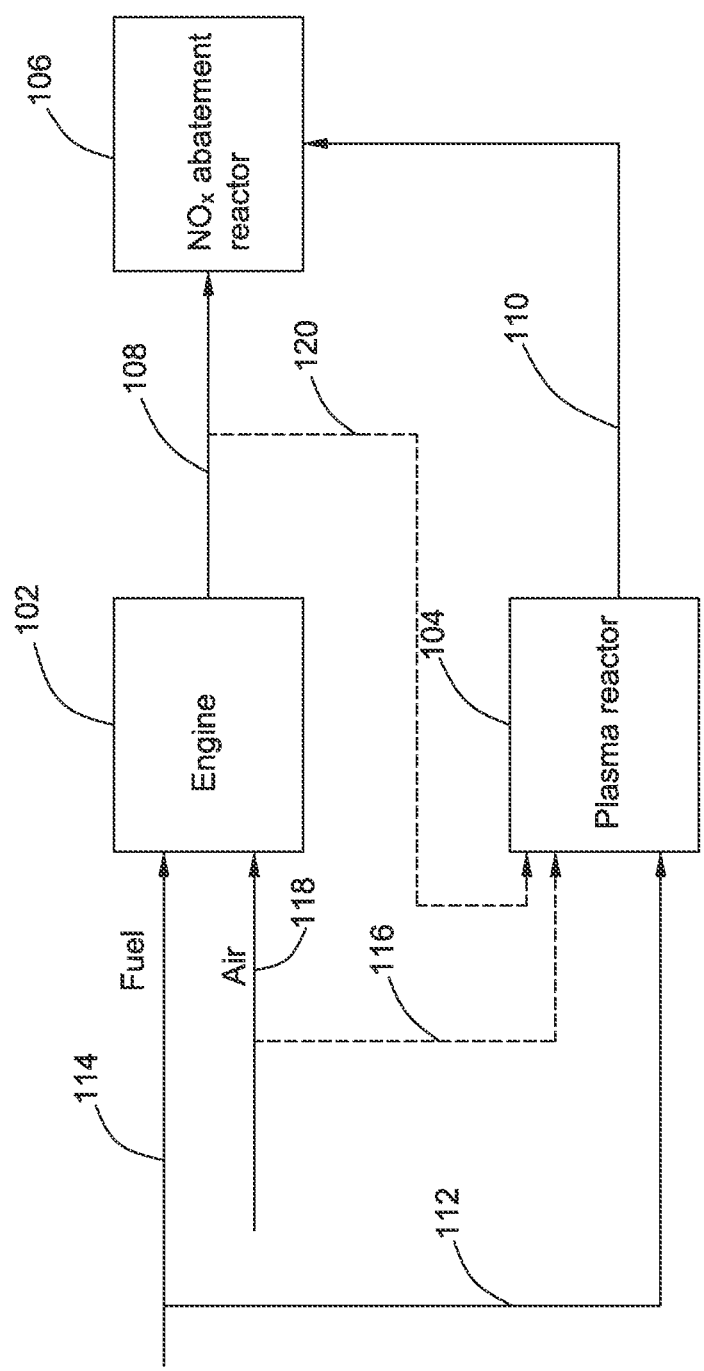
FIG. 1 is a diagram illustrating an exemplary nitrogen oxide (NOx) abatement system, according to one embodiment of the present disclosure.

Referring to FIG. 1, on a site where a power generation device such as an engine 102 is located, a plasma reactor 104 and a NOx abatement reactor 106 are provided. The plasma reactor 104 is capable of reforming a hydrogen-element containing fuel such as methane and syngas with nitrogen to in situ produce ammonia. The NOx abatement reactor 106 is loaded with a $NH_3$-SCR catalyst that is capable of reducing NOx with ammonia to nitrogen. An exhaust conduit 108 is used for delivering an exhaust stream containing NOx from the power generation device 102 to the NOx abatement reactor 106. Moreover, the ammonia produced in the plasma reactor 104 is delivered into the NOx abatement reactor 106 through a conduit 110. The NOx contained in the exhaust stream reacts with the ammonia in the presence of the $NH_3$-SCR catalyst, and thereby is converted to nitrogen that is not toxic.

The hydrogen-element containing fuel reformed in the plasma reactor 104 may be from fuel that is supplied to the power generation device 102. In some embodiments, the fuel supplied to the power generation device 102 may contain methane, for example, may contain higher than 90% or, in an embodiment, higher than 95% of methane by volume. In particular, the fuel supplied to the power generation device 102 is methane itself, as used herein, referring to fuel containing higher than 99% of methane by volume. In some embodiments, the fuel supplied to the power generation device 102 may contain syngas, for example, may contain higher than 90% or, in an embodiment, higher than 95% of syngas by volume. In particular, the fuel supplied to the power generation device 102 is syngas itself, as used herein, referring to fuel containing higher than 99% of syngas by volume. In the illustrated embodiment, a fuel branch conduit 112 branched off of a fuel supply conduit 114 for supplying fuel to the power generation device 102, is used for diverting a portion of fuel from the fuel supply conduit 114 into the plasma reactor 104. In these embodiments, reforming only a small amount of fuel-and-$N_2$ mixture may produce enough ammonia that is needed for the NOx reduction. As such, less energy is needed to produce enough ammonia compared to producing ammonia via reforming the whole exhaust which contains NOx and some unburnt fuel. In particular, only a small slip stream of fuel is reformed in the plasma reactor 104. For example, in some embodiments, smaller than about 1% or, in an embodiment, smaller than 0.5% by volume of the fuel supplied to the power generation device 102 is diverted into the plasma reactor 104 for reforming.

Nitrogen used for reforming the hydrogen-element containing fuel in the plasma reactor 104 may come from the exhaust, air or from any other source that contains nitrogen. In some embodiments, the exhaust or air is directly used for reforming. In some embodiments, nitrogen separated from the exhaust or air is used for reforming. In a specific embodiment, nitrogen used for reforming the fuel is from air that is provided to the power generation device 102 for power generation. An air branch conduit 116 branched off of an air supply conduit 118 for supplying air to the power generation device 102, is used for diverting a portion of air from the air supply conduit 118 to the plasma reactor 104 as a source of nitrogen. In another specific embodiment, nitrogen used for reforming the fuel comes from the exhaust steam from the power generation device 102. An exhaust branch conduit 120 branched off of the exhaust conduit 108 is used for delivering a portion of the exhaust into the plasma reactor as a source of nitrogen.

There may be meters for metering the hydrogen-element containing fuel and nitrogen (or nitrogen source) that are fed into the plasma reactor and controllers for controlling the metering. In some embodiments, the hydrogen-element containing fuel is methane, and the methane ($CH_4$) concentration (in $N_2$) may be in a range from about 0.1-50 volume %. There may be a monitor unit for monitoring the $CH_4$:$N_2$ ratio. Moreover, there may be one or more controllers for optimizing the $CH_4$:$N_2$ ratio fed into the plasma reactor by adjusting the $CH_4$:$N_2$ ratio based on the metered and/or monitored data.

Plasma Reactor

Either thermal or non-thermal plasma reactors may be used to carry out the reforming. In a specific embodiment, a pulsed corona discharge type of plasma reactor (also called a sliding discharge plasma reactor) is used. In the plasma reactor, the hydrogen-element containing fuel such as $CH_4$ and syngas reacts with $N_2$ to form $NH_3$ under plasma. The synthesis of ammonia using plasmas is based on micro-gap discharge under environmentally friendly conditions. It is likely that both $NH_3$ and $H_2$ are produced during the reactions. In some embodiments, the yield to $NH_3$ and $H_2$ can be adjusted by adjusting reaction conditions, plasma types, and/or plasma settings.

Plasma Power Source

Many kinds of power sources may be used for supplying power for the plasma reactor.

In a specific embodiment, a direct current (DC) power source, which is capable of max voltage of about 30 kV, frequency from about 1 Hz to 250 Hz and a pulse width of about 80 ns is used. This type of power source is expected to provide a high voltage and thereby good performance for reforming hydrogen-element containing fuel such as methane and syngas.

In another specific embodiment, a DC power source, which is capable of a max voltage of about 10 kV, frequency up to 2700 Hz and a pulse width larger than 200 ns is used. NOx conversion is expected to decrease with increasing pulse width, decreasing frequency and decreasing voltage.

In another specific embodiment, an alternating current (AC) power source, which is capable of max voltage (peak to peak) of about 30 kV is used. Different from the square waves generated by the DC power source, the AC power source generates a sinusoidal wave. NOx conversion is expected to increase with increasing frequency of the sinusoidal wave and increasing voltage.

$NH_3$-SCR Catalyst

A range of different catalysts including but not limited to metal-exchanged zeolite catalysts and vanadium oxide-based catalysts may be used as the $NH_3$-SCR catalysts. In a detailed embodiment, a commercial catalyst including Fe/Cu-exchanged zeolites is used.

EXAMPLE

Figure 2:
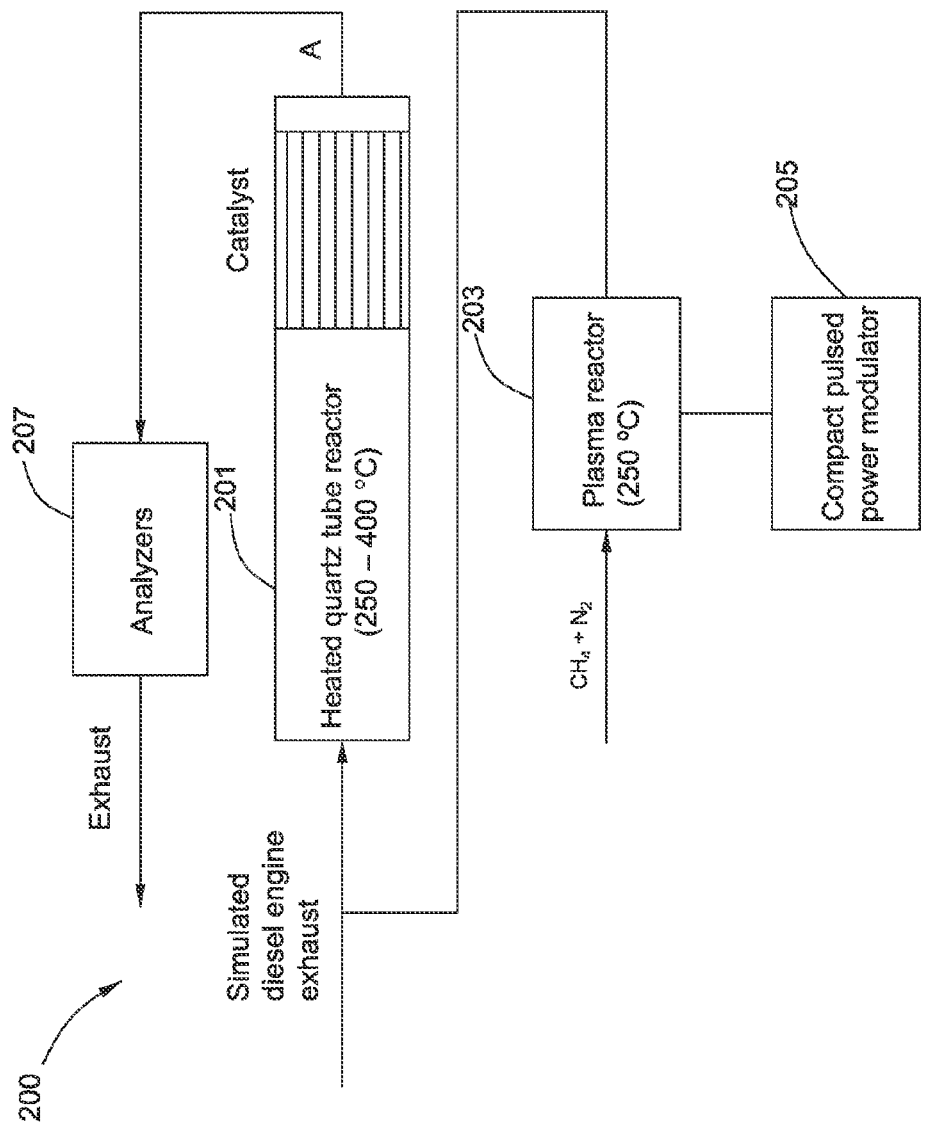
FIG. 2 is a schematic flow diagram of a $NH_3$-SCR setup with a non-thermal surface plasma reformer based on shielded sliding discharge, which is used for a test experiment.

In a test experiment, an experimental setup 200 as shown in FIG. 2 was used. A commercial Cu-exchanged zeolite $NH_3$-SCR catalyst was loaded into a quartz tube reactor 201 and kept at about 250-400° C. A mixture of $CH_4$ and $N_2$ ($CH_4$ concentration of about 0.2-1 volume %) was flowed through a plasma reactor (shielded sliding discharge reformer) 203. $CH_4$ and $N_2$ react in the plasma reactor 203 before it was passed through the catalyst in the quartz tube reactor 201 and met other reactants.

A compact pulsed power modulator (CPPM) 205 (MPC3000S-OP1, Suematsu) was used to deliver high voltage pulses of positive polarity to the plasma reactor. The plasma reactor was kept at a temperature of about 250° C. while the temperature of the catalyst reactor was set at a defined value in a range from about 250° C. to about 400° C. The plasma reactor in this experiment was operated at about 27 kV peak voltage, 250 Hz frequency, 80 ns pulse duration (full width half magnitude, FWHM). The gas stream passing through the catalyst includes about 300 parts per million by volume (ppmv) of NO, 9% of $O_2$ by volume, 7% of H₂O by volume, the products from the plasma reactor, and balance $N_2$. The space velocity was kept at about 30000 hour$^{-1}$. The gas stream exiting the catalyst was monitored by analyzers 207 which included a Multigas™ FTIR analyzer (2030 HS, MKS) and a chemiluminescence NOx analyzer (600 HCLD, CAI). The NOx conversion efficiencies were calculated from the data recorded 50 minutes after the $NH_3$ dosage in the system reached the desired level. After each activity test, the catalysts were regenerated in 9% of $O_2$ by volume at about 550° C. for about 1 hour.

Figure 3:
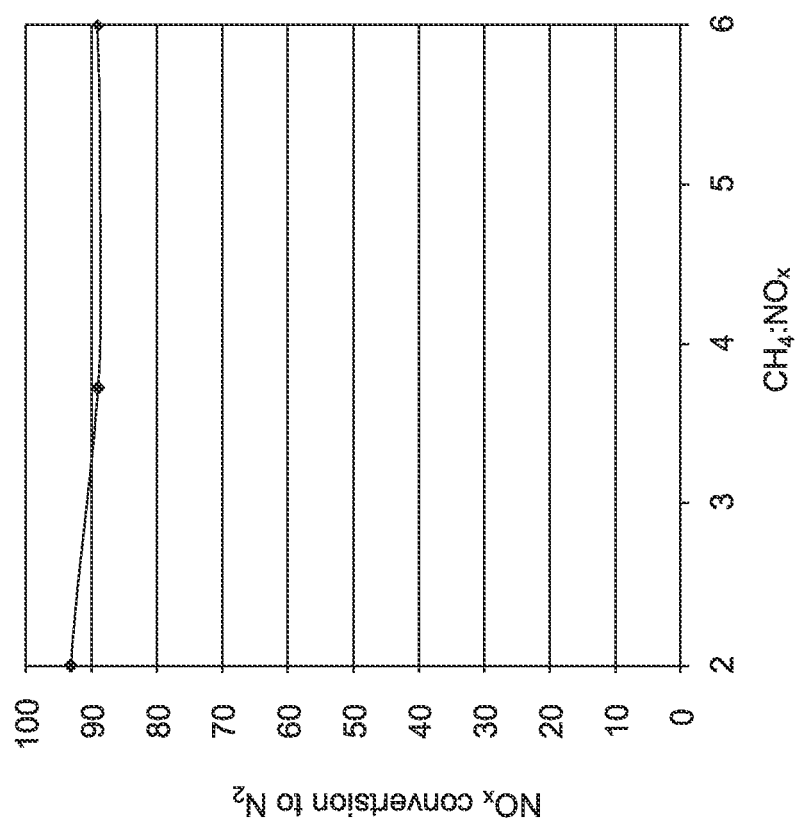
FIG. 3 shows NOx conversion versus $CH_4$:NOx ratio for the test experiment.

The flow going through the plasma reactor was about 0.8 standard liters per minute (SLPM). The total flow in the system was about 3.4 SLPM. The NOx concentration before the catalyst was about 300 parts per million (ppm). The $CH_4$:NOx ratio varied from 2 to 6. When $CH_4$:NOx=2, the $CH_4$ concentration in the plasma reactor was 2*300*(3.4/0.8)=2550 ppm=0.255% by volume. When $CH_4$:NOx=6, the $CH_4$ concentration in the plasma reactor was 6*300*(3.4/0.8)=7650 ppm=0.765% by volume. The NOx conversion to $N_2$ may decrease with increasing $CH_4$:NOx ratio. Referring to FIG. 3, when $CH_4$:NOx=2, the NOx conversion is about 93%, and when $CH_4$:NOx=4 or 6, the NOx conversion is about 89%.

The invention may be embodied in other specific forms without departing from the spirit or essential characteristics thereof. The foregoing embodiments are therefore to be considered in all respects as illustrative rather than limiting on the invention described herein. The scope of embodiments of the invention is thus indicated by the appended claims rather than by the foregoing description, and all changes that come within the meaning and range of equivalency of the claims are therefore intended to be embraced therein.

What is claimed is:

1. A nitrogen oxide (NOx) abatement system, comprising:
   a power generation device for generating power from a hydrogen-element containing fuel;
   an exhaust conduit in flow communication with an exhaust stream containing NOx, which comes from the power generation device;
   a plasma reactor for reforming a portion of the hydrogen-element containing fuel with nitrogen to produce ammonia;
   a NOx abatement reactor containing ammonia selective catalytic reduction (NH3-SCR) catalyst, for receiving the exhaust stream and the ammonia and reducing NOx in the exhaust stream by causing the NOx to react with the ammonia to form nitrogen;
   a fuel supply conduit for supplying a hydrogen-element containing fuel to the power generation device; and
   a fuel branch conduit branched off of the fuel supply conduit for diverting a portion of the hydrogen-element containing fuel into the plasma reactor.

2. The NOx abatement system according to claim 1, wherein the hydrogen-element containing fuel comprises syngas.

3. The NOx abatement system according to claim 1, wherein the hydrogen-element containing fuel comprises methane.

4. The NOx abatement system according to claim 1, further comprising:
   an exhaust branch conduit branched off of the exhaust conduit for delivering a portion of the exhaust into the plasma reactor as a source of nitrogen.

5. The NOx abatement system according to claim 1, further comprising:
   an air branch conduit branched off of an air supply conduit for supplying air to the power generation device, for delivering a portion of the air into the plasma reactor as a source of nitrogen.

6. A nitrogen oxide (NOx) abatement system, comprising:
   a power generation device for generating power from a hydrogen-element containing fuel;
   a plasma reactor for reforming a portion of the hydrogen-element containing fuel with nitrogen to produce ammonia;
   a NOx abatement reactor for receiving an exhaust stream containing NOx from the power generation device and the ammonia from the plasma reactor, and reducing the NOx by causing the NOx to react with the ammonia to form nitrogen; and
   an air branch conduit branched off of an air supply conduit for supplying air to the power generation device, for delivering a portion of the air into the plasma reactor as a source of nitrogen.

7. The NOx abatement system according to claim 6, further comprising:
   a fuel supply conduit for supplying a hydrogen-element containing fuel to the power generation device; and
   a fuel branch conduit branched off of the fuel supply conduit for diverting a portion of the hydrogen-element containing fuel into the plasma reactor.

* * * * *